United States Patent [19]
Miranti, Jr. et al.

[11] Patent Number: 4,617,007
[45] Date of Patent: * Oct. 14, 1986

[54] BELT CONSTRUCTION FOR A CONTINUOUSLY VARIABLE TRANSMISSION, TRANSVERSE BELT ELEMENT THEREFOR AND METHODS OF MAKING THE SAME

[75] Inventors: Joseph P. Miranti, Jr., Porter Township, Christian County; Larry R. Oliver; Clyde O. Johnson, both of Springfield, all of Mo.

[73] Assignee: Dayco Corporation, Dayton, Ohio

[*] Notice: The portion of the term of this patent subsequent to Aug. 6, 2002 has been disclaimed.

[21] Appl. No.: 713,943

[22] Filed: Mar. 20, 1985

Related U.S. Application Data

[62] Division of Ser. No. 501,357, Jun. 6, 1983, Pat. No. 4,533,342.

[51] Int. Cl.⁴ ............................. F16G 5/00; F16G 5/12
[52] U.S. Cl. ..................................... 474/201; 474/242
[58] Field of Search ............... 474/201, 242, 207, 265, 474/238

[56] References Cited

U.S. PATENT DOCUMENTS 4,457,742  7/1984  Hattori et al. ............... 474/201
4,484,903 11/1984  Schneider ..................... 474/201

Primary Examiner—Stephen J. Novosad
Assistant Examiner—Bruce M. Kisliuk
Attorney, Agent, or Firm—Joseph V. Tassone

[57] ABSTRACT

A belt construction for a continuously variable transmission, a transverse belt element therefor and methods of making the same are provided, the belt construction comprising an endless flexible band unit, and a plurality of belt elements carried by the band unit in sliding relation therewith, each belt element having a slot arrangement receiving the band unit therein and having opposed faces disposed in compressed relation against adjacent faces of adjacent belt elements. Each belt element is formed substantially solely from a high performance polymeric material that has high heat resistance, high compressive modulus, high toughness and high strength.

18 Claims, 6 Drawing Figures

BELT CONSTRUCTION FOR A CONTINUOUSLY VARIABLE TRANSMISSION, TRANSVERSE BELT ELEMENT THEREFOR AND METHODS OF MAKING THE SAME

CROSS REFERENCE TO RELATED APPLICATION

This application is a divisional patent application of its copending parent patent application, Ser. No. 501,357, filed June 6, 1983, now U.S. Pat. No. 4,533,342.

BACKGROUND OF THE INVENTION

1. Field of the Invention

This invention relates to an improved endless power transmission belt construction for a continuously variable transmission and to a transverse belt element therefor as well as to methods of making the belt construction and the belt element.

2. Prior Art Statement

It is known to provide a belt construction for a continuously variable transmission wherein the belt construction comprises an endless flexible band means and a plurality of belt elements carried by the band means in sliding relation therewith, each belt element having slot means receiving the band means therein and having opposed faces disposed in compressed relation against adjacent faces of adjacent belt elements. Such belt elements are formed from metallic material. For example, see the U.S. Pat. No. 3,720,113, to Doorne et al, the U.S. Pat. No. 4,299,586 to Aberson, and the U.S. Pat. No. 4,080,941 to Vollers.

While it is applicants' belief that no one has provided such a belt construction wherein all of the belt elements are formed substantially solely from a high performance polymeric material that has high heat resistance, high compressive modulus, high toughness and high strength according to the teachings of this invention, the U.S. Pat. No. 7,338,081 to Hattori et al, has every other belt element between the driving metal belt elements thereof formed as a non-driving belt element and formed of "non-metallic material having excellent compression resistance, such as synthetic resin, carbon graphite, synthetic resin containing carbon graphite fibers, and hard rubber so that the weight of the torque transmission belt can be reduced." It should also be noted that this U.S. Pat. No. 4,338,081 while describing that the main belt elements are formed of tool steel states "Furthermore, the main blocks 7 can be made of material other than tool steel if it has the sufficient strength and abrasion resistance required in torque transmitting means of this type."

It is also known to provide a belt construction for a continuously variable transmission and comprising an endless flexible band means and a plurality of belt elements carried by the band means in sliding relation therewith, each belt element having slot means receiving the band means therein and having opposed faces disposed in compressed relation against adjacent faces of adjacent belt elements. Each belt element has opposed sides for respectively engaging pulley faces of the transmission. The slot means for each belt element defines a pair of slots respectively interrupting the opposed sides thereof and being spaced from each other by a central stem portion of the element. The pair of slots for each element receive parts of the band means therein and respectively define a pair of shoulders engaging the parts of the band means, each shoulder of each belt element having an arcuate transverse crown surface provided with an apex that engages its respective part of the band means. For example, see the aforementioned U.S. Pat. No. 4,080,841 to Vollers, wherein it appears in FIG. 3 thereof that the apexes of the surfaces 9 are each disposed in the center of its respective transverse shoulder.

SUMMARY OF THE INVENTION

It is one feature of this invention to provide an improved belt construction for a continuously variable transmission wherein all of the belt elements are formed of polymeric material which will allow for major weight reduction of the transmission system and may also allow for higher belt speeds since centrifugally-generated tension would be reduced.

For example, it is believed according to the teachings of this invention that each belt element for the belt construction for a continuously variable transmission can be formed substantially solely from a high performance polymeric material that has high heat resistance, high compressive modulus, high toughness and high strength.

In particular, one embodiment of this invention provides a belt construction for a continuously variable transmission, the belt construction comprising an endless flexible band means, and a plurality of belt elements carried by the band means in sliding relation therewith. Each belt element has slot means receiving the band means therein and has opposed faces disposed in compressed relation against adjacent faces of adjacent belt elements. Each belt element is formed substantially solely from a high performance polymeric material that has high heat resistance, high compressive modulus, high toughness and high strength.

While it is believed according to the teachings of this invention that such a belt construction can be utilized in a conventional lubricated environment for the continuously variable transmission, each belt element of this invention can be provided with a lubricating filler means therein so that the continuously variable transmission utilizing the belt construction of this invention would have the belt elements thereof be self-lubricating and thereby allow the transmission to run in an unlubricated environment, such as in air, without undue wear on the belt elements, sheaves, or tensile bands.

It is another feature of this invention to provide an improved belt construction for a continuously variable transmission wherein each belt element tends to bias its respective part of the band means toward its respective central stem rather than toward its respective pulley face of the transmission.

In particular, it is believed according to the teachings of this invention that if the band means can be prevented from engaging against the pulley faces during the operation of the continuously variable transmission, wear out of the pulley faces by such band means will be prevented.

Accordingly, it is believed that the apex of each transverse crown surface of the respective belt element of this invention can be offset relative to the center between its respective side and the central stem of that belt element to tend to bias its respective part of the band means toward the central stem rather than toward its respective side.

For example, one embodiment of this invention provides a belt construction for a continuously variable transmission, the belt construction having an endless flexible band means, and a plurality of belt elements carried by the band means in sliding relation therewith, each belt element having slot means receiving the band means therein and having opposed faces disposed in compressed relation against adjacent faces of adjacent belt elements. Each belt element has opposed sides for respectively engaging pulley faces of the transmission, the slot means for each belt element defining a pair of slots respectively interrupting the opposed sides thereof and being spaced from each other by a central stem portion of the belt element. The pair of slots for each belt element receive parts of the band means therein and respectively defining a pair of shoulders engaging the parts of the band means, each shoulder of each belt element having an arcuate transverse crown surface provided with opposed ends and an apex intermediate those opposed ends that engages its respective part of the band means. The apex of each transverse crown surface of its respective belt element is offset relative to the center point that is between its respective opposed ends to tend to bias its respective part of the band means toward its respective central stem rather than toward its respective side.

Accordingly, it is an object of this invention to provide an improved belt construction for a continuously variable transmission, the belt construction of this invention having one or more of the novel features of this invention as set forth above or hereinafter shown or described.

Another object of this invention is to provide a method for making such a belt construction, the method of this invention having one or more of the novel features of this invention as set forth above or hereinafter shown or described.

Another object of this invention is to provide an improved belt element for such a belt construction, the belt element of this invention having one or more of the novel features of this invention as set forth above or hereinafter shown or described.

Another object of this invention is to provide an improved method of making such a belt element, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
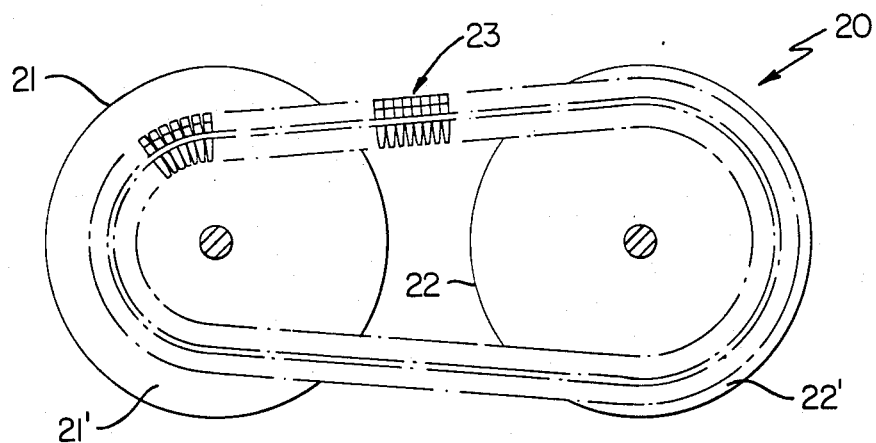
FIG. 1 is a schematic side view of a continuously variable transmission means with parts in section, the transmission means including the improved belt construction of this invention.

While the various features of this invention are hereinafter illustrated and described as providing a belt construction particularly adapted to be utilized for continuously variable transmission purposes, it is to be understood that the various features of this invention can be utilized singly or in any combination thereto to provide a belt construction for other uses as desired, such as for driving accessories for an engine of a transportation vehicle. Also, such belt construction could be utilized in place of other conventional belts, as desired.

Therefore, this invention is not to be limited to only the embodiment illustrated in the drawings because the drawings are merely utilized to illustrate one of the wide variety of uses of this invention.

Referring now to FIG. 1, a conventional continuously variable transmission arrangement is generally indicated by the reference numeral 20 and comprises a pair of rotatable pulleys 21 and 22 one of which is to be driven by the other thereof by means of an endless power transmission belt construction of this invention that is generally indicated by the reference numeral 23 and which operates, in general, in a manner conventional in the art, the pulleys 21 and 22 having variable diameters in a manner well known in the art whereby a continuously variable transmission is provided by the arrangement 20 in a manner well known in the art and as set forth in the aforementioned four U.S. Pats. Nos. 3,720,113; 4,080,841; 4,299,586 and 4,338,081 and the United Kingdom Patent application No. GB 2,088,018A whereby these four patents and patent application are being incorporated into this disclosure by this reference thereto.

Since the operation of a continuously variable power transmission arrangement is well known in the art, a further description of the arrangement 20 need not be set forth as the features of this invention will be directed to the endless power transmission belt construction 23 which will be hereinafter described.

However, it is to be understood that the arrangement 20 could operate in an externally lubricated environment as is conventional with all metal belt constructions for continuously variable transmission systems or can operate in a non-lubricated environment as will be apparent hereinafter.

The endless belt construction 23 of this invention comprises an endless flexible band means or tensile means that is generally indicated by the reference numeral 24 and a plurality of transverse belt elements 25 carried by the carrier means or band means 24 in a manner hereinafter set forth.

The flexible band means 24 actually comprises a pair of band means 24A and 24B disposed and held in spaced apart parallel relation by the belt elements 25 in a manner hereinafter set forth, each band means 24A or 24B being formed from a single endless element or a plurality of endless elements as is conventional in continuously variable transmission systems whereby the band means 24A and 24B are merely illustrated schematically as being formed from a single layer of metallic material with the understanding that the same can be formed from a plurality of layers in a conventional manner and of other materials as desired.

Figure 4:
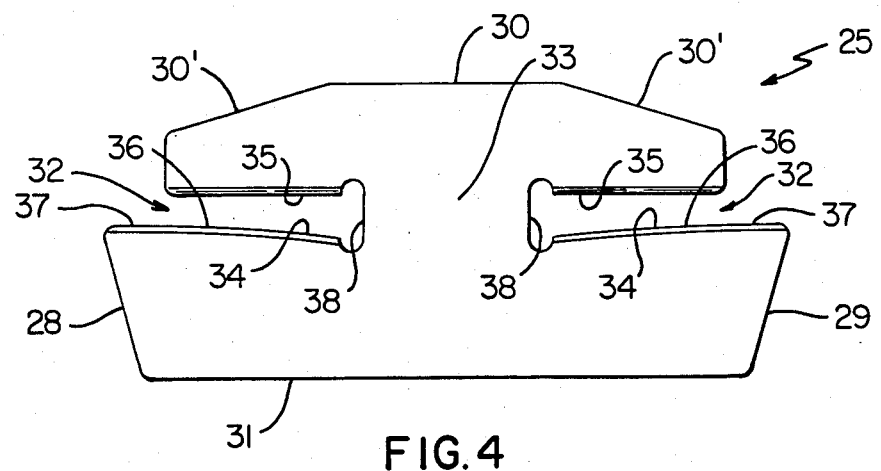
FIG. 4 is an enlarged front view of one of the transverse belt elements of the belt construction of FIGS. 1-3 before the same is assembled to the flexible band means of the belt construction of FIGS. 1-3.

Each transverse belt element 25 of this invention is substantially trapezoidal in configuration when viewed in the manner illustrated in FIG. 4 and has opposed front and rear faces 26 and 27 as well as opposed side faces 28 and 29 with the side faces 28 and 29 being angled relative to each other to give a substantially "V" shape to each belt element 25 and to engage the angled pulley faces 21' and 22' of the pulleys 21 and 22 in a conventional manner.

Each belt element 25 also has a top face or side 30 and a bottom face or side 31 which are disposed substantially parallel to each other and are substantially flat as illustrated. If desired, the top surface or face 30 can have angled opposed ends 30' as illustrated.

the opposed front and rear faces 26 and 27 of each belt element 25 have upper portions 26' and 27' that are disposed substantially parallel to each other and lower portions 26" and 27" which respectively taper toward each other as they approach the bottom surface 31.

Each side face 28 and 29 is interrupted by a slot 32 which is disposed spaced from the other slot 32 so as to define a central stem portion 33 of the belt element 25 therebetween, each slot 32 defining a lower shoulder 34 that will engage part of the inside surface of the band means 24 as will be apparent hereinafter. Each slot 32 also defines an upper shoulder 35 which is normally spaced from the top surface of the band means 24. Each shoulder 34 of the belt element 25 defines a transverse crown surface 36 which is uniquely constructed so that the same has the apex 37 thereof disposed closely adjacent the side 28 or 29 of the respective slot 32 so as to be offset relative to the center of the transverse crown surface 36 between the respective side 28 or 29 and the adjacent surface 38 of the central stem 33 for a purpose hereinafter set forth. In one embodiment of the belt element 25 of this invention the apex or peak 37 of the crown surface 36 of each shoulder 34 is located approximately directly beneath the outer end of its respective top surface 30' so that approximately $\frac{2}{3}$ of the length of the crown surface 36 extends from the apex 37 to the adjacent surface 38 of the central stem 33 of that belt element and approximately $\frac{1}{3}$ of the length of the crown surface 36 extends from the apex 37 to the adjacent end face 28 or 29.

Figure 5:
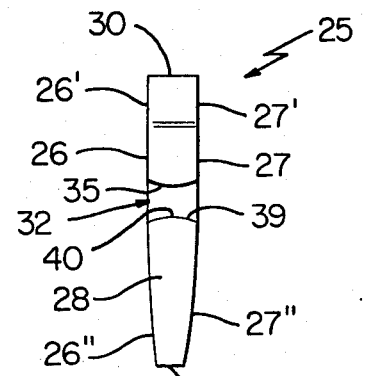
FIG. 5 is a side view of the belt element of FIG. 4.

Each shoulder 34 of the belt element 25 also defines a longitudinal crown surface 39 as illustrated in FIG. 5 with the apex 40 of the surface 39 being disposed substantially in the center between the opposed front and rear faces 26 and 27 of the belt element 25 as illustrated.

Figure 2:
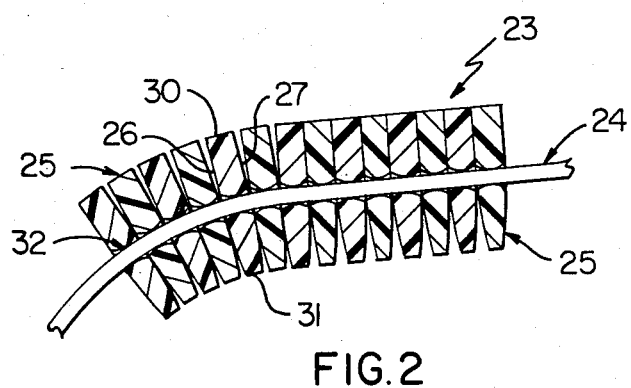
FIG. 2 is an enlarged cross-sectional view of a portion of the belt construction of FIG. 1.

The compression pitch line for each belt element 25 is chosen according to the teachings of this invention so that the required elongation of the band means 24 when all of the elements 25 are carried thereby in the manner illustrated in FIGS. 1 and 2 will be less than 10% of the yield elongation of the band means 24 whereby it can be seen that in the completed belt construction 23, the band means 24 will be under tension while each belt element 25 will be under compression between adjacent faces 26 and 27 of the adjacent elements 25 throughout the entire length of the band means 24.

Figure 3:
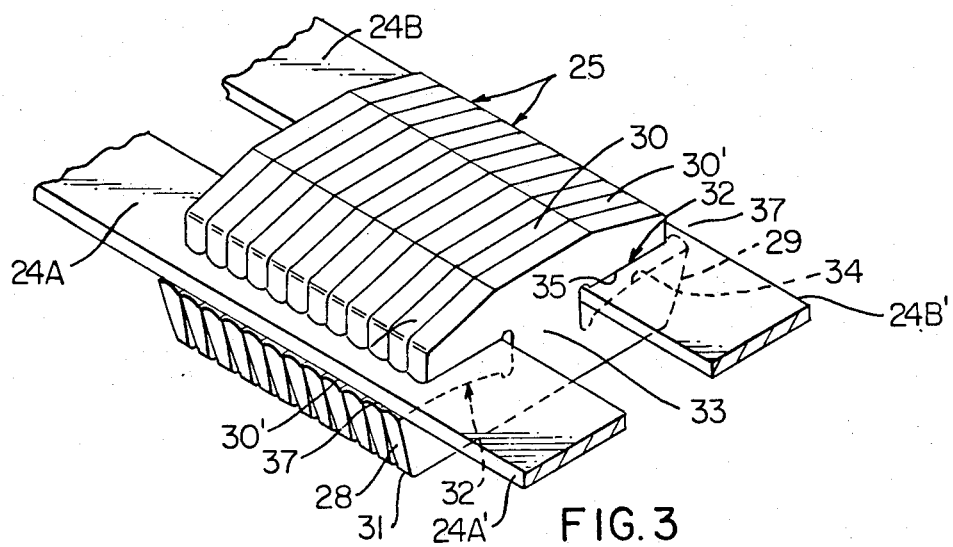
FIG. 3 is a fragmentary perspective view of part of the belt construction of FIG. 2.
Figure 6:
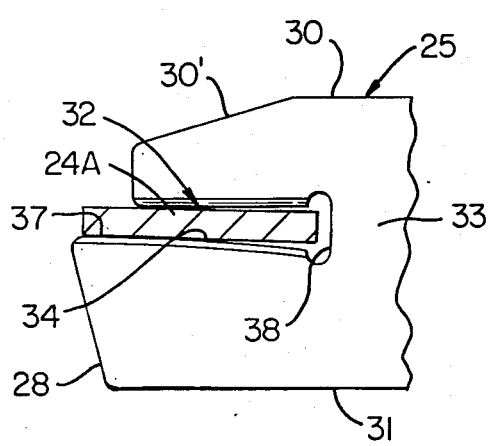
FIG. 6 is a fragmentary view similar to FIG. 4 and illustrates the belt element when assembled to part of the band means of the belt construction of FIGS. 1-3.

When the elements 25 are assembled onto the band parts 24A and 24B as illustrated in FIG. 3, by merely having the band parts 24A and 24B inserted into the slots 32, it can be seen that the apexes 37 of the transverse crown surfaces 26 of each element 25, as illustrated in FIG. 6, tend to bias the particular band part 24A or 24B toward the central stem 33 of the element 25 rather than toward the respective side 28 or 29 thereof so that the tendency of the band means 24A or 24B to engage against the pulley faces 21' and 22' during the operation of the system 20 is less likely and therefore will not tend to wear out the surfaces 21' and 22' as would be the case if such surfaces 21' and 22' were being utilized as the means for confining the band means 24A and 24B in the slots 32 as in the prior known continuously variable transmission arrangements.

While the band sections 24A and 24B are respectively being illustrated as having the outer end edges 24A' and 24B' disposed short of the surfaces 28 and 29 when the elements 25 are assembled thereon in the manner illustrated in FIGS. 3 and 6, it is to be understood that the outer end edges 24A' and 24B' of band means 24A and 24B can extend closely adjacent the surfaces 28 and 29 while still being disposed closely adjacent the central stem portion 33 as illustrated.

In any event, it can be seen that it is a relatively simple method of this invention to form the belt elements 25 into the configuration illustrated so that when the same are assembled to and are operating with the band means 24 in the system 20, the movement of the elements 25 relative to the band means 24 as in conventional continuously variable transmission systems can take place and the apexes 37 of the longitudinal crown surfaces 36 of the shoulders 34 of each belt element 25 will tend to bias the band sections 24A and 24B inwardly toward the central stem portion 33 for the reasons previously set forth and thus, away from the pulley faces 21' and 22'.

While it is believed that the elements 25 can be made of any suitable material, as previously stated, it is another feature of this invention to form the belt elements 25 for the belt construction 23 substantially solely from a high performance polymeric material that has high heat resistance, high compression modulus, high toughness and high strength.

For example, such polymeric material can be selected from the group of a polyamide-imide, polyimide, polyphenylene sulfide, nylon—6 or 6/6 or 6/10, aromatic polyamide, polyvinylidene fluoride, polyetheretherketone, polyetherimide, perfluoroalkoxy-modified tetrafluoroethylene, polytetrafluoroethylene, and polyethersulfone, as well as other polymeric materials that meet the above characteristics. For example, the above mentioned polyamide-imide can be purchased from Amoco Chemicals Corporation, P. O. Box 8640A, Chicago, Ill, 60680, under the trademark "TORLON."

In addition, while certain of the above polymeric materials are self-lubricating, such polymeric materials can be made self-lubricating or further self-lubricating by being filled with a lubricating filler means. For example, a dry lubricant, such as polytetrafluoroethylene, molybdenum disulfide, graphite or other suitable lubricating filler means can be utilized.

In addition, the polymeric material could be further strengthened by having strengthening or reinforcing filler means disposed therein, such as glass, carbon, etc. and the filler means could be as fibers, powder, etc.

In any event, by providing the aforementioned self-lubricating polymeric material, it is believed according to the teachings of this invention that when the belt elements 25 are utilized with the band means 24 in the manner previously set forth, the transmission means 20 need not be operating in a lubricating environment as the same may be operating in air whereby the self-lubricating features of the belt elements 25 will prevent wear and galling of the interacting surfaces, especially between the elements 25 and the contacting sheave faces 21' and 22'.

Of course, the self-lubricating polymeric material previously set forth is not limited to an unlubricated system, because even in lubricated environment, the self-lubricating polymeric material would provide protection for the system if an occasional lubricant-starved environmental condition should exist. Further, such materials would also allow the use of water base hydraulic fluids or glycol-based coolants instead of petroleum-based fluids as required with all metal belt constructions.

It is also believed that the use of the aforementioned polymeric materials for the elements 25 will allow major weight reduction of the system 20 over the previously known metallic systems and may also allow higher belt speeds, since centrifugally-generated tension would be reduced. In addition, it might be found that failure associated hazards are reduced.

Further, adjacent belt elements 25 could each be formed of a different polymeric material for improved performance characteristics therebetween, as desired.

In any event, it can be seen that it is a relatively simple method of this invention to form the belt elements 25 of the aforementioned polymeric material, such as by molding the polymeric material into the desired configuration, whether the desired configuration is as illustrated in FIG. 4 or any other suitable configuration, as it is believed according to the teachings of this invention that before this invention there has not been a belt construction for a continuously variable transmission wherein all of the belt elements thereof are formed substantially solely from a high performance polymeric material that has high heat resistance, high compressive modulus, high toughness and high strength whereby the system 20 will operate in the manner previously set forth.

Also, it is to be understood that the band means 24 of the belt construction 23 of this invention can have polymeric material similar to the polymeric material of the elements 25 forming at least a part thereof, such as by a coating on the surfaces thereof, that would improve the performance of the action not only between the layers of the band means 24, but also between the band means 24 and the elements 25. Of course, the polymeric material of its band means 24 could be a different material from the material of the elements 25 in order to have unique performance characteristics.

Accordingly, it can be seen that this invention not only provides an improved belt construction for a continuously variable transmission and method of making the same, but also this invention provides an improved belt element for such a belt construction and a method of making such a belt element.

While the forms and method steps of this invention now preferred have been illustrated and described as required by the Patent Statute, it is to be understood that other forms and method steps can be utilized and still fall within the scope of the appended claims.

What is claimed is:

1. In a belt construction for a continuously variable transmission, said belt construction comprising an endless flexible band means, and a plurality of belt elements carried by said band means in sliding relation therewith, each belt element having slot means receiving said band means therein and having opposed faces disposed in compressed relation against adjacent faces of adjacent belt elements, each belt element having opposed sides for respectively engaging pulley faces of said transmission, said slot means for each belt element defining a pair of slots respectively interrupting said opposed sides thereof and being spaced from each other by a central stem portion of said element, said pair of slots for each element receiving parts of said band means therein and respectively defining a pair of shoulders engaging said parts of said band means, each shoulder of each belt element having an arcuate transverse crown surface provided with opposed ends and an apex intermediate those opposed ends that engages its respective part of said band means, the improvement wherein said apex of each transverse crown surface of its respective belt element is offset relative to the center point thereof that is between its respective opposed ends to tend to bias its respective part of said band means toward its respective central stem rather than toward its respective side and wherein each belt element is formed substantially solely from a high performance polymeric material that has high heat resistance, high compressive modulus, high toughness and high strength.

2. A belt construction as set forth in claim 1 wherein said polymeric material has lubricating filler means therein.

3. A belt construction as set forth in claim 2 wherein said lubricating filler means comprises a dry lubricant.

4. A belt construction as set forth in claim 3 wherein said dry lubricant is polytetrafluoroethylene.

5. A belt construction as set forth in claim 3 wherein said dry lubricant is molybdenum disulfide.

6. A belt construction as set forth in claim 1 wherein said polymeric material has structural filler means therein.

7. A belt construction as set forth in claim 6 wherein said structural filler means comprises glass.

8. A belt construction as set forth in claim 6 wherein said structural filler means comprises carbon.

9. A belt construction as set forth in claim 1 wherein said polymeric material is selected from the group of a polyamide-imide, polyimide, polyphenylene sulfide, nylon—6 or 6/6 or 6/10, aeromatic polyamide, polyvinylidene fluoride, polyetheretherketone, polyetherimide, perfluoroalkoxy-modified tetrafluoroethylene, polytetrafluoroethylene, and polyethersulfone.

10. In a method of making a belt construction for a continuously variable transmission, said method comprising the steps of forming an endless flexible band means, forming a plurality of belt elements, and causing said belt elements to be carried by said band means in sliding relation therewith, said step of forming said belt elements causing each belt element to have slot means receiving said band means therein, each belt element to have opposed faces disposed in compressed relation against adjacent faces of adjacent belt elements, each belt element to have opposed sides for respectively engaging pulley faces of said transmission, each belt element to have said slot means thereof defining a pair of slots respectively interrupting said opposed sides thereof and being spaced from each other by a central stem portion of said element, each belt element to have said pair of slots thereof receiving parts of said band means therein and respectively defining a pair of shoulders engaging said parts of said band means, and each belt element to have each shoulder thereof having an arcuate transverse crown surface provided with opposed end and an apex intermediate those opposed ends that engages its respective part of said band means, the improvement comprising the steps of forming said apex of each transverse crown surface of its respective belt element to be offset relative to the center point thereof that is between its respective opposed ends to tend to bias its respective part of said band means toward its respective central stem rather than toward its respective side, and forming each belt element substantially solely from a high performance polymeric material that has high heat resistance, high compressive modulus, high toughness and high strength.

11. A method of making a belt construction as set forth in claim 10 and including the step of filling said polymeric material with lubricating filler means.

12. A method of making a belt construction as set forth in claim 11 wherein said lubricating filler means comprises a dry lubricant.

13. A method of making a belt construction as set forth in claim 12 wherein said dry lubricant is polytetrafluoroethylene.

14. A method of making a belt construction as set forth in claim 12 wherein said dry lubricant is molybdenum disulfide.

15. A method of making a belt construction as set forth in claim 10 and including the step of filling said polymeric material with structural filler means.

16. A method of making a belt construction as set forth in claim 15 wherein said structural filler means comprises glass.

17. A method of making a belt construction as set forth in claim 15 wherein said structural filler means comprises carbon.

18. A method of making a belt construction as set forth in claim 10 wherein said polymeric material is selected from the group of a polyamide-imide, polyimide, polyphenylene sulfide, nylon—6 or 6/6 or 6/10, aeromatic polyamide, polyvinylidene fluoride, polyetheretherketone, polyetherimide, perfluoroalkoxy-modified tetrafluoroethylene, polytetrafluoroethylene, and polyethersulfone.

* * * * *